Oct. 22, 1929.   C. A. DAWLEY   1,732,434
METER
Filed May 7, 1924   3 Sheets-Sheet 1

Inventor
Clarence A. Dawley

Oct. 22, 1929.    C. A. DAWLEY    1,732,434
METER
Filed May 7, 1924    3 Sheets-Sheet 2

Inventor
Clarence A. Dawley

Oct. 22, 1929.  C. A. DAWLEY  1,732,434
METER
Filed May 7, 1924   3 Sheets-Sheet 3
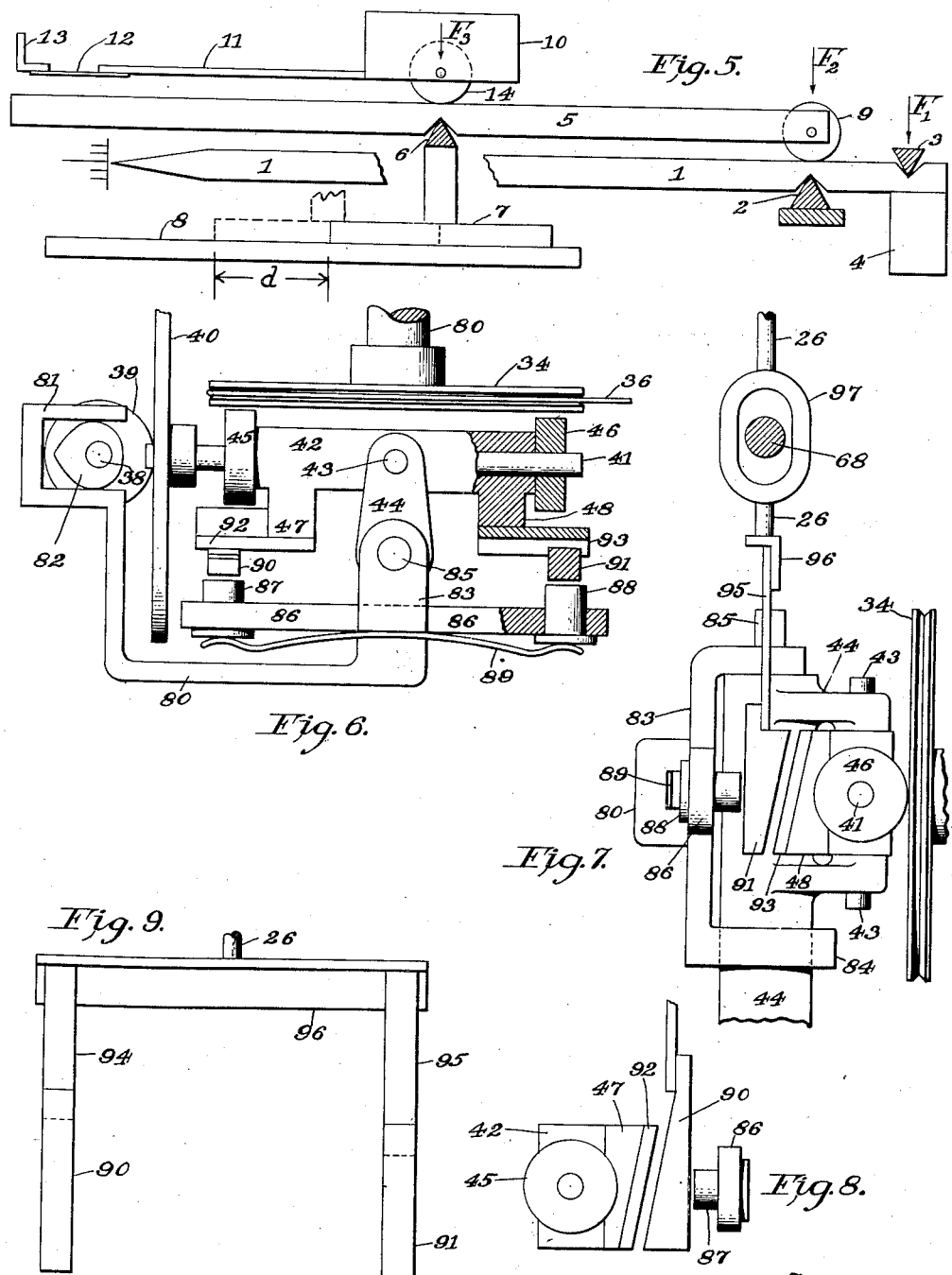

Patented Oct. 22, 1929

1,732,434

UNITED STATES PATENT OFFICE

CLARENCE A. DAWLEY, OF PLAINFIELD, NEW JERSEY

METER

Application filed May 7, 1924. Serial No. 711,677.

My invention relates to a mechanical device for establishing the position of a member which position, measured from zero position, is proportional to the square root of a quantity representing a force, for indicating or recording such position, for integrating or totalizing the average position over a period of time, and for other functions as herein described. This device is applicable chiefly in connection with measurement by means of flow meters in which a head is established by flow passing an orifice, a Venturi tube, or other device having similar characteristics. Such meters are based on the principle that the head established varies as the square of the rate of flow, or conversely that the rate of flow is proportional to the square root of the head. In a broad sense such meters include the means of producing head and a differential gauge for measuring such head and translating it into terms of rate of flow. My invention, which for brevity I refer to as a meter, relates especially to a device for receiving a force and translating it into a motion or travel which is proportional to the square root of the force received. My meter is applicable to flow measurement and also to other uses. It may be used as a tachometer to measure the speed of a pump or fan which produces a pressure varying as the square of the speed, also to measure the speed of a mechanical centrifugal device, such as a governor, in which the centrifugal force developed varies as the square of the speed.

The object of my invention is to provide a device of the kind described, which is free from cams, shaped floats, parabolic reservoirs and other devices which have heretofore been used in flow meters for obtaining a motion proportional to rate of flow. Further object is to provide a device free from inaccuracies due to friction, to relieve the applied force from doing any mechanical work such as overcoming the friction of an integrator, or the drag of a recording pen, to provide a meter of great sensitivity and accuracy, to simplify manufacture by using only straight-line and plain circular motions, and other objects which will be apparent to those skilled in the art.

Figures 1, 2:
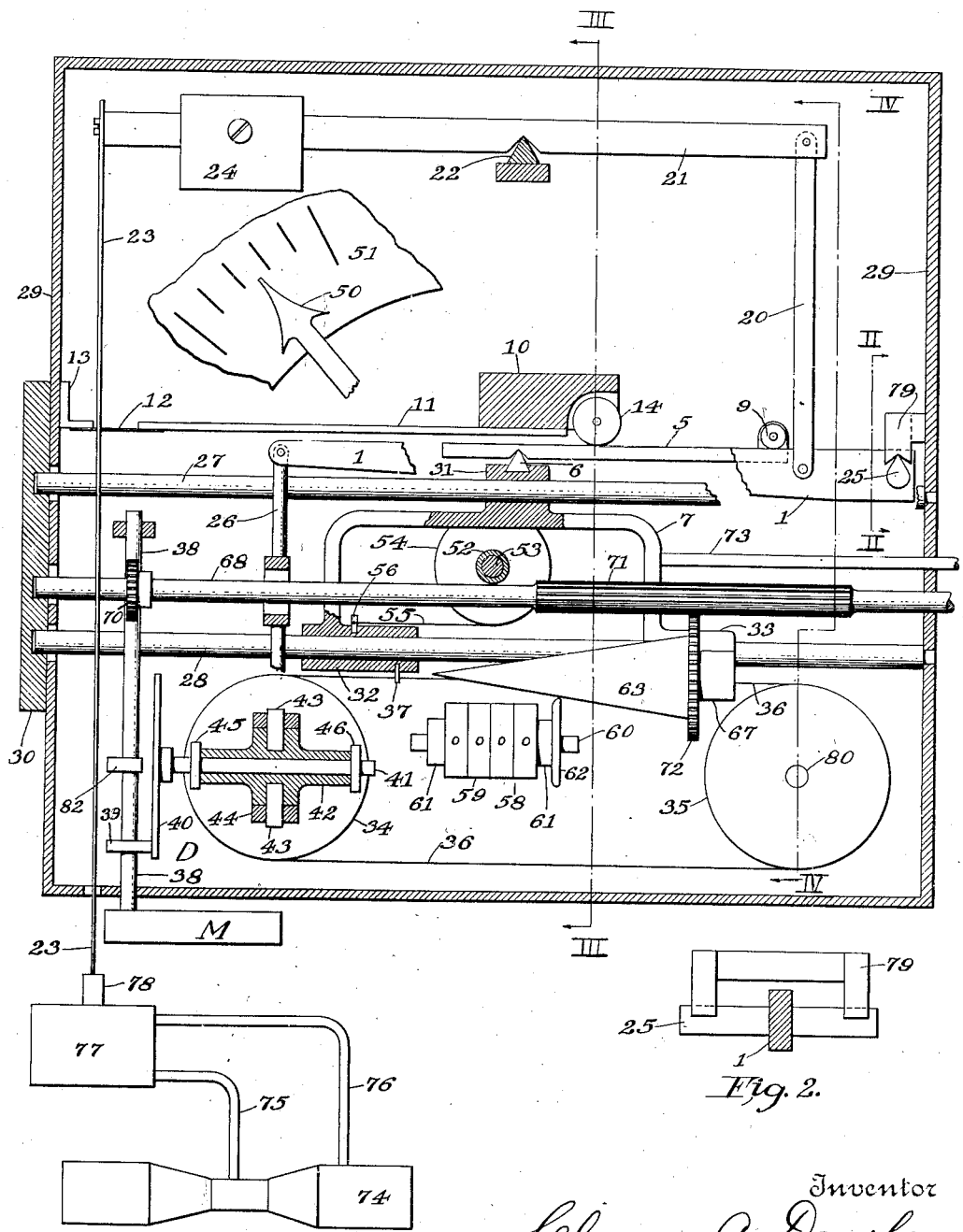
Figure 3:
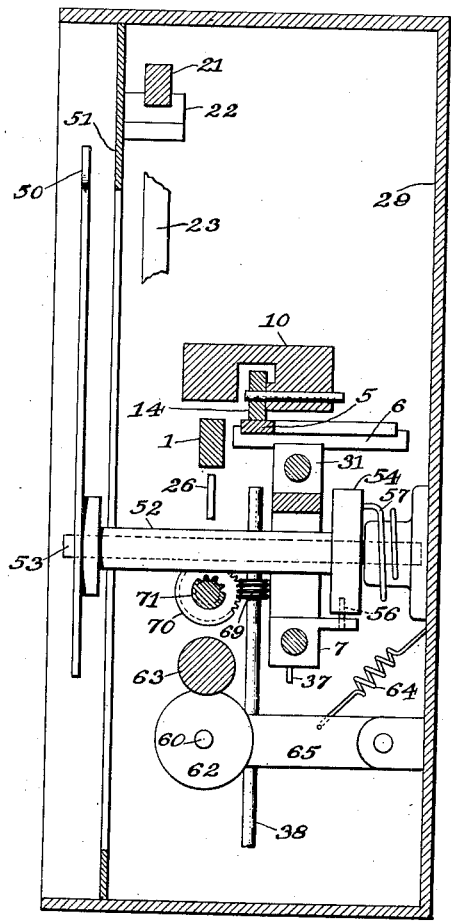
Figure 4:
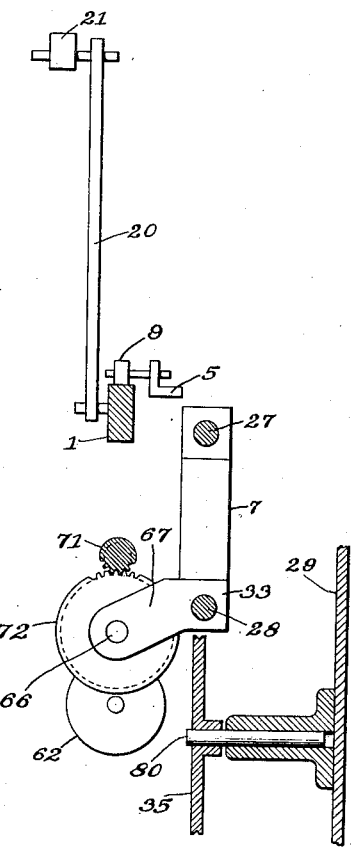

In the drawings, Fig. 1 is a front elevation, partly in section, of my improved meter shown in connection with a Venturi tube for use as a flow meter. Fig. 2 is a section on line II—II of Fig. 1. Fig. 3 is an end elevation, partly in section, on line III—III of Fig. 1, Fig. 4 is an end elevation, partly in section, on line IV—IV of Fig. 1. Fig. 5 is a diagrammatic representation showing in elevation certain elements of my improved meter. Fig. 6 is a plan view showing, on a larger scale, the adjusting mechanism represented by letter D in Fig. 1. Fig. 7 is an elevation looking toward the right hand end of Fig. 6. Fig. 8 is a partial elevation looking toward the left hand end of Fig. 6, and with certain parts omitted. Fig. 9 is a front elevation showing certain parts taken out from Figs. 6 and 7.

Referring to Fig. 5, 1 is a balance member or lever mounted on a fixed knife edge pivot 2. A force $F_1$ may be applied at floating pivot 3. The lever may be counterbalanced by a weight 4 so that it will be in gravity balance when no forces are applied. When the lever is in balance the top surface is horizontal and the pointer at the free end of the lever will be at the center mark of the graduations as shown. 5 is a beam pivoted on knife edge 6 which latter is supported by carriage 7. The carriage is free to slide on guide 8 in a direction parallel to lever 1. Beam 5 carries, near one end, a roller 9 which constitutes a rolling bearing on the top surface of lever 1. Beam 5 is in gravity balance about its pivot 6 when no external forces are applied to the beam; roller 9 would then be in normal contact with lever 1 but would transmit no force to the lever. Weight 10 is attached to arm 11 which in turn is held by flexible ligament 12 to a fixed support 13. This permits weight 10 to swing slightly with the ligament as a hinge, but prevents any horizontal travel of the weight. Weight 10 has a roller 14 which gives the weight bearing on the beam. In the position shown, referred to as the zero position, roller 14 is directly above pivot 6 and force $F_3$ due to weight 10 has no tendency to unbalance lever 5. If now a force $F_1$ is applied to lever 1, it will cause an unbalance of this lever, making the left hand end rise. If carriage 7 is then moved a distance ($d$) to the left along guide 8, roller 9 will travel the same distance on lever 1 and roller 14 will be at the same distance to the right of pivot 6. Lever 5 will be unbalanced by force $F_3$ and a force $F_2$ will be applied by roller 9 to lever 1. Force $F_2$ will be a function of force $F_3$ and distance $d$. By moving carriage 7 to proper position, force $F_2$, acting at distance $d$ from pivot 2, will offset force $F_1$ and bring lever 1 again into balance. The turning moment or torque tending to unbalance lever 1 is force $F_1$ multiplied by the fixed lever arm at which it acts. The turning moment tending to restore lever 1 to balance is proportional to $F_2 \times d$; $F_2$ is proportional to $F_3 \times d$; therefore the balancing turning moment is proportional to $F_3 \times d^2$. As $F_3$ is constant, it follows that when the opposed turning moments are equalized and lever 1 is in balance, $d^2$ varies as $F_1$, or $d$ varies as $\sqrt{F_1}$. In other words, the travel or motion of the carriage from zero position varies as the square root of the unbalancing force applied to lever 1.

The arrangement shown in Fig. 5 is objectionable on account of instability and because of the excessive overall length required. In Fig. 1 a practical arrangement is shown in which parts having the same reference numbers correspond to those of Fig. 5. I move the fixed pivot near to the end of lever 1 and apply force $F_1$ through link 20 which lifts upward on the lever. A lever 21 is carried on pivot 22 and receives a downward pull at its left hand end from flexible ligament 23. The lever transmits a corresponding pull from its right hand end to link 20. A movable weight 24 on lever 21 serves to provide gravity balance to lever 1. Beam 5 may be shortened at its left hand end and gravity balance for the beam provided by having the zero position of roller 14 to the left of pivot 6 instead of directly above it. The zero position for roller 9 is directly over pivot 25. In Fig. 1, the carriage, beam 5, etc. are not shown in zero position but at about one third of their maximum travel. Beam 5 is lowered so that its top surface is at about the same height as the top of lever 1. No pointer is provided on lever 1 but a link 26 connects with automatic means for adjusting carriage 7 and maintaining lever 1 in balance. I refer to the force acting through link 20 as the "unbalancing force" and the force acting through roller 9 as the "balancing force", regardless of whether the free end of lever is above or below its central position.

The action of the device as shown in Fig. 1 is the same as previously described in connection with Fig. 5, in that the distance traveled by the carriage from its zero position varies as the square root of the unbalancing force applied to lever 1. Carriage 7 is carried on and guided by guide bars 27 and 28 which are mounted at one end in the side of the housing 29 of the meter. The other end of the guide bars is mounted in plate 30 which in turn is attached to the housing. Upper boss 31 of carriage 7 is bored to give a sliding fit on bar 27 and lower bosses 32 and 33 are similarly bored to slide over bar 28. This arrangement insures that the carriage is held firmly in position except for travel along the guide bars. The travel of the carriage is accomplished through mechanism D of Fig. 1, which is shown more in detail in Figs. 6 to 9 inclusive.

In Fig. 1, 34 and 35 are sheaves mounted on journals 80 which allow them to turn. 34 is the driving sheave and 35 is the follower. They are connected by a flexible cable 36 which is drawn tight enough to act as a belt over the two sheaves. The cable is attached by pin 37 to carriage 7 so that rotation of the sheaves causes a corresponding travel of the carriage. M is a motor, either a clockwork motor or other type, which drives shaft 38 at a controlled speed. Friction wheel 39 on the shaft is in contact with the face of disc 40 which it drives by friction. Disc 40 is mounted on shaft 41 which is journaled in frame 42. The frame is mounted on pins 43 carried in fixed support 44. The frame is permitted to oscillate slightly about pins 43 as an axis. Two friction wheels 45 and 46 are fixed to shaft 41 and rotate with it when motor M is running. These wheels are mounted directly in front of sheave 34 so that either wheel is capable of driving the sheave by friction when pressed against the face of the sheave. It is obvious that when wheel 45 is driving it will rotate the sheave in one direction and when wheel 46 is driving it will operate the sheave in opposite direction. Means under control of lever 1 are provided so that when the free end of lever rises above its central or balanced position, sheave 34 will turn in counter-clockwise direction, moving carriage 7 and roller 9 to the left and applying an increasing downward force to lever 1 at an increasing distance from pivot 25, until the lever is restored to its central position. Conversely when the free end of the lever drops below central position, sheave 34 will turn in clockwise direction and move carriage 7 to the right until the balance of lever 1 is restored. The position of carriage 7 may be shown by a hand 50 moving over scale divisions on dial plate 51. The hand is mounted on a sleeve 52 which is journaled on stud 53. A collar 54 on the sleeve is connected by flexible ligament 55 to a pin 56 fixed in carriage 7. Motion of the carriage to the left will turn sleeve 52 and give to hand 50 an angular travel proportional to the linear travel of the carriage. The indications of the hand on the dial plate will then give a magnified reading of the position of the carriage. A spring 57 (shown in Fig. 3) causes the hand to return when carriage moves in opposite direction.

To automatically average and totalize the position of the carriage, an integrator 58 may be used. This consists of the usual counting wheels 59 mounted on a shaft 60 which is carried in bearings 61. A wheel 62 is fixed to the shaft and is held in frictional contact with cone 63 by means of spring 64 (Fig. 3) which pulls upward on arm 65. Bearings 61 are formed in the outer end of arm 65. Cone 63 is rotatably mounted on a stud 66 which is firmly supported in bracket 67. The latter is formed integrally with boss 33 of carriage 7. A rotating shaft 68 is driven by worm 69 and worm wheel 70 from shaft 38. Shaft 68 has an elongated pinion 71 of greater length than the travel of carriage 7, so that the pinion may always be in mesh with gear 72 which is mounted on the base of cone 63. The cone rotates continually at a definite speed and also reciprocates with carriage 7. When the carriage is in zero position, wheel 62 is at the point of the cone where diameter is zero and consequently wheel 62 will not be rotated. As carriage moves to the left, the contact point of wheel 62 on the cone surface is at a radius proportional to the travel of the carriage and the cone; wheel 62 will then be rotated at a speed proportional to the travel of the carriage. Integrator 58 will therefore totalize the average position of the carriage. Shaft 68 may be extended and may drive a roll of tape (not shown). Rod 73 attached to carriage 7, may be extended and carry a stylus (not shown) acting on the tape driven by shaft 68. In this way the position of carriage 7 may be registered in the form of a continuous curve which will give a permanent record, as contrasted with the instantaneous registration afforded by hand 50.

In Fig. 1, I show my meter connected with a Venturi tube 74 for use as a flow meter. When fluid flows in the tube in the direction shown by arrow there will be a reduced pressure at the throat of the tube as compared with the pressure in the entrance section. These pressures are carried by pipes 75 and 76 to opposite ends of a cylinder and piston device 77, by means of which the difference of the two pressures or the "Venturi head" is applied to piston rod 78. This rod is connected to ligament 23, resulting in an upward force on lever 1 through link 20 which force varies directly as the Venturi head or as the square of the rate of flow in the Venturi tube. The travel of carriage 7, hand 50, and cone 63, controlled as previously described, will therefore be directly proportional to the rate of flow. Fig. 2 shows the arrangement of pivot 25 and pivot bearing 79 which permits roller 9, in its zero position, to be directly over or opposite the fixed pivot of lever 1. Figs. 3 and 4 show the arrangement, in end elevation, of certain parts previously described.

In Figs. 6 to 9, the device D for effecting travel of carriage 7 is shown in greater detail than in Fig. 1. A fixed support 44 carries pins 43 on which frame 42 is swivelled. An oscillator 83 is swivelled at its upper end on pin 85 to support 44 and at its lower end has an enlarged ring 84 which is mounted freely on support 44. Projecting arms 86 are integral with the oscillator. The oscillator is fixed to crank 80 which has a yoke portion 81 engaging with an eccentric or cam 82. The cam is attached to and rotates with shaft 38.

Rotation of the cam will obviously cause oscillator 83 to have a small angular motion about pin 85 as a center, this motion being first in one direction and then the other. Frame 42 has projecting lugs 47 and 48, the ends of which lugs are beveled in opposite directions. Wedge blocks 92 and 93 are attached at the ends of these lugs. Arms 86 are fitted with plugs 87 and 88, these plugs having a free fit in the arms. A spring 89 holds the plugs so that their collar portion is normally against the arms, but by flexing the spring away from the arm the plugs may be displaced outward. Wedge 90 is suspended so as to be interposed between plug 87 and block 92; wedge 91 is similarly interposed between plug 88 and block 93. Wedge 90 has its thin end upward and wedge 91 has its thin end downward. In the position shown, which is central position, friction wheels 45 and 46 are slightly out of contact with sheave 34, and wedges 90 and 91 are suspended freely between their respective plugs or blocks. As cam rotates and moves, for example, the right hand end of arm 86 toward the sheave, plug 88 will come into contact with wedge 91 and in turn will move the wedge into contact with block 93, tending to press wheel 46 into contact with the sheave. The clearances are so arranged that when wedges are in central position as shown, the travel of cam is not more than sufficient to take up the clearances and there is therefore no driving of sheave 34. If however, the wedges are below the position shown, then the clearance of wedge 91 will be reduced; less of the cam travel will be required to take up this clearance and wheel 46 will be pressed into contact with sheave 34, causing same to rotate more or less depending on the position of the wedge and the time that wheel 46 is held in contact with the sheave. When wedges move downward, the clearance of wedge 90 increases as that of wedge 91 decreases; therefore wheel 45 will not drive sheave in opposite direction on the opposite throw of the cam. Spring 89 has an initial pressure on the plugs sufficient to insure driving of the sheave, but if the throw of cam is more than sufficient for causing drive to occur, then the spring permits plugs to slip back in arm 86 so as to avoid overstrain on the mechanism.

Wedges 90 and 91 are suspended by links 94 and 95 from cross bar 96. The cross bar in turn is supported from the free end of lever 1 through link 26. The latter may have a yoke 97 surrounding shaft 68 and permitting a limited motion of lever 1. When the lever is in its central or balanced position as shown in Fig. 1, the wedges should be in their central position as shown in Fig. 7. Any tendency of lever 1 to oscillate, or sway as a pendulum, is retarded or damped by the intermittent gripping of one or both of the wedges 90 and 91 between their respective plugs and blocks. When either wedge is gripped it at once stops further vertical motion of the wedges and of link 26. For each rotation of shaft 38 there is at least one interval when one of the wedges is so gripped. This is followed by a period during which the wedges are free, so that lever 1 is permitted to adjust itself to varying forces but is prevented from setting up periodic oscillations.

It will be seen that in my improved meter there is no work imposed upon the balance member. The carriage and related parts, such as indicating hand and integrator, are actuated by an independent motor. The action of this motor in moving the carriage is controlled by the position of lever 1 which determines the position of wedges 90 and 91. The wedges are entirely relieved from exerting any force as they merely transmit the force applied to them from the cam. At frequent intervals, between the adjusting periods, the wedges are suspended freely and permit lever 1 to adjust itself without friction. The intermittent gripping action of the wedges serves to stabilize the lever and prevent oscillations and consequent false adjustments of the carriage. The action on the lever is comparable to that of a dashpot.

I have shown one embodiment of my invention but do not limit myself to the particular details of construction herein described.

What I claim is—

1. A balance member, a pivot for said member, means for applying a force tending to unbalance said member, means for applying a variable counterforce to the balance member at a variable distance from said pivot, and means varying said counterforce proportionally to the distance of its point of application from said pivot.

2. A balance member, a fixed pivot for said member, means for applying a force tending to unbalance said member, a beam having a movable bearing on the balance member, a movable carriage having a pivot for said beam, means controlled by the balance member for moving said carriage, and means for applying a force to said beam at a point on the beam which point varies with the position of the movable carriage.

3. A balance member, a fixed pivot for said member, means for applying a force tending to unbalance said member, a movable beam having a pivot, means for moving said beam with its pivot, said movable beam having a bearing on the balance member which bearing is directly opposite the pivot of the balance member when the movable beam is in zero position, said bearing moving with said beam, and fixed position loading means for said movable beam, said loading means being so positioned that the movable beam is substantially in balance about its pivot when the beam is in zero position.

4. A balance member, a fixed pivot for said member, means for applying a force tending to unbalance said member, a beam, a pivot forming a bearing for said beam, a movable support for said pivot, a second bearing for said beam, said second bearing supported on said balance member and moving with said beam and its support, and loading means for said beam, said loading means being fixed in position relative to the fixed pivot of the balance member.

5. A balance member, means for applying an unbalancing force to said member, a movable carriage, a fixed support for said carriage, means responsive to the balance member for moving said carriage, balancing means moved by the carriage and applying a counterforce to the balance member at a point on the balance member which point varies with the movement of the carriage, and means rendering said counterforce proportional to the distance of its point of application from zero position.

6. A balance member, means for applying an unbalancing force to said member, a movable carriage, a fixed support for said carriage, means responsive to the balance member for moving said carriage, balancing means moved by the carriage and applying a counterforce to the balance member at a point on the balance member which point varies with the movement of the carriage, means rendering said counterforce proportional to the distance of its point of application from zero position, and means indicating the position of the carriage.

7. In a flow meter, head producing means, a balance member, means for applying to the balance member a force derived from the head produced, a movable carriage, a fixed support for said carriage, a motor, control means responsive to said balance member through which control means the motor moves the carriage, balancing means actuated by the carriage and applying a counterforce to the balance member at a point on said member which point varies with the movement of the carriage, means rendering said counterforce proportional to the distance of its point of application from zero position, and means registering the position of the carriage.

8. A balance member, means for applying an unbalancing force to said member, balancing means applying a counterforce to said member, means controlled by the balance member for varying the point of application of the counterforce to the balance member, and means rendering said counterforce proportional to the distance of its point of application from zero position.

In testimony whereof I have signed my name to this specification.

CLARENCE A. DAWLEY.